A. PARTRIDGE.
Wrenches.
No. 141,289.  Patented July 29, 1873.
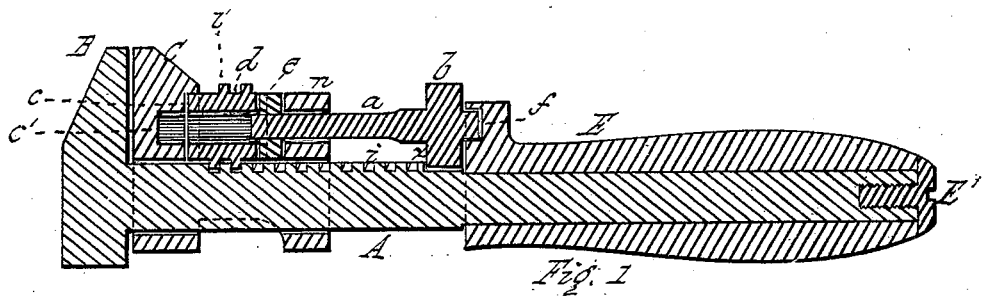
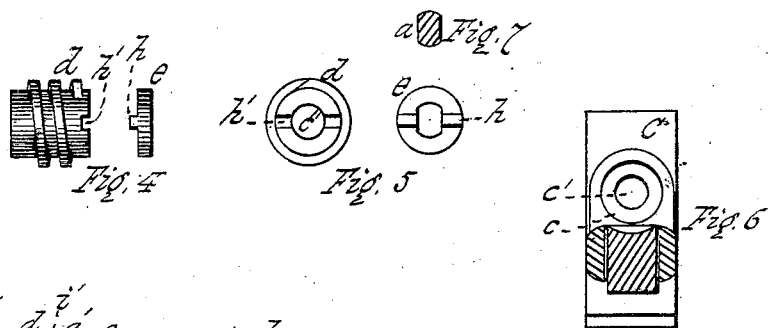
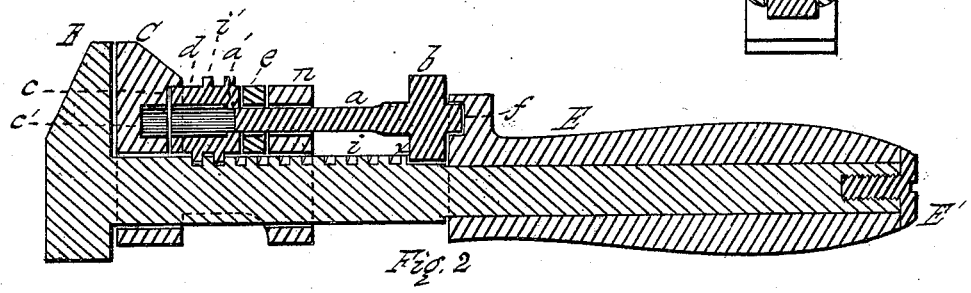
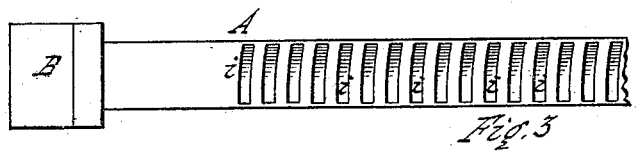
Witnesses,
C. Eugene Buckland.
S. W. Doherty
Inventor,
Andrew Partridge
By J. H. Curtis.
his atty.

UNITED STATES PATENT OFFICE.

ANDREW PARTRIDGE, OF SPRINGFIELD, MASSACHUSETTS.

IMPROVEMENT IN WRENCHES.

Specification forming part of Letters Patent No. 141,289, dated July 29, 1873; application filed March 19, 1873.

*To all whom it may concern:*

Be it known that I, ANDREW PARTRIDGE, of Springfield, in the county of Hampden and State of Massachusetts, have invented a new and useful Improvement in Screw-Wrenches; and I do hereby declare that the following is a full, clear, and exact description thereof, reference being had to the accompanying drawings making a part of this specification, and to the letters of reference marked thereon, in which—

Figure 1 is a longitudinal section, showing all the parts of the wrench in place. Fig. 2 is a similar view, showing a slight modification of the same invention. Fig. 3 is a plan view of the rack or recesses on the bar, in which the thread of the worm-piece operates. Fig. 4 is a side view of the worm and its collar. Fig. 5 is an end view of the same. Fig. 6 is a rear view of the movable jaw, showing the recess in which the end of the worm-piece has its bearing; and Fig. 7 is a transverse section of the flattened part of the rod.

My invention relates to an improvement in the ordinary screw-wrenches used for turning nuts and other like purposes; and it consists of a worm having its bearing at one end in a recess made in the movable jaw of the wrench, its thread engaging with a rack or series of recesses made in the bar, and said worm being held in place and operated by means of a flattened rod and auxiliary collar, said rod operating through a flattened aperture either in the worm-piece or in the collar, and being held in place by a step in the handle and a shoulder in the bar, against which the thumb-piece has its bearing.

That others skilled in the art may be able to make and use my invention, I will proceed to describe its construction and operation.

In the drawings, A is the bar having the ordinary permanent jaw B thereon, and C is the movable jaw, which is connected by side pieces to its guide-piece n, which slides with the jaw C to and fro on the bar A. The jaw C has a recess, c, therein, of a size and form to receive the end of the worm-piece d, having a thread, i', upon its periphery, which engages with the series of recesses i on the bar. These recesses are in form the segment of a helix, and are made to correspond with the same portion of the thread i', by which the bar is rendered stronger, as none of its stock is needlessly cut away, as is usually the case when the recesses are cut of a uniform depth across the entire width of the bar. The worm-piece is made of a length to just pass in between the inner faces of the jaw C and the guide-piece n, and the collar e is of such thickness that when the worm-piece d is dropped in between the jaw C and its guide-piece n, and passed up into the recess c, the collar will just fill the space between the end of the worm-piece and the guide-piece. The rod a is flattened on two of its sides, as shown clearly in Figs. 1 and 2, and in section in Fig. 7, and one end rests in a step or recess, f, in the handle E, and its thumb-piece b has a bearing against a shoulder, x, on the bar A. The worm-piece d and the guide-piece n are both perforated with a round hole of such diameter as to receive the flattened rod a easily; but the collar e has an elongated hole therein of a size and form to just receive the flattened rod a, but so that the rod may slide through said hole easily. The worm-piece d has a recess, h', in its end, and the collar e has a corresponding projection thereon, which fits into the recess h when both are in place. The handle E may be held in place upon the bar by a small screw, E', turned into the end of the bar, and against the end of the handle, or by any other desirable means.

The parts of the wrench are put in place by removing the handle E and placing the movable jaw C on the bar, and placing the worm-piece d in between the jaw C and its guide-piece n, with the threads i' in the recesses i on the bar, and then turning the worm-piece until its end is up firmly to its bearing in the recess c. The collar e is then placed in between the end of the worm-piece and the guide-piece n, with the projection h in the recess h', and the end of the flattened rod a is inserted through the holes in the guide-piece n and the collar e, and when the jaw C is up against the jaw B the end of the rod a just enters the hole in the worm-piece d, as shown clearly in Figs. 1 and 2, and the handle E is then placed on the bar, with the end of the rod a in the step or recess f, and the thumb-piece b against the shoulder x on the bar. The jaw C has a recess, $c'$, therein of the same diameter as the cylindrical hole through the worm-piece, so that as the rod $a$ is rotated by the thumb-piece $b$ the rod turns the collar $e$, and that rotates the worm-piece, and the thread $i'$, operating in the recesses $i$ of the bar, draws the guide-piece $n$ and jaw C down toward the thumb-piece $b$, and the end of the rod $a$ may then enter the recess $c'$ to permit a longer traverse of the jaw C than would otherwise be the case.

The extreme ends of the thread $i'$ on the worm-piece are made of full size, and with a sharp corner at the periphery, so that as the piece is rotated the extreme ends of the thread, as they enter the recesses $i$, completely fill the latter, and clean out any dirt that may accumulate therein.

Instead of making the projections $h$ on the collar $e$ and the corresponding recesses $h'$ in the worm-piece, and making the elongated hole in the collar, the worm-piece $d$ might be provided with the elongated hole to receive the flattened bar $a$, in which case a cylindrical hole might be made in the collar, which would then be used merely to fill up the space between the worm-piece and the guide-piece $n$, and with no projections $h$ thereon. This arragement is shown in Fig. 2, and is the same in principle of operation as that shown in Fig. 1.

A wrench having the movable jaw recessed to receive the end of the worm-piece is operative even if the rod $a$ and collar $e$ be removed, as all the force employed in turning a nut is brought to bear against the worm-piece, and its thread operating in the rack or recesses $i$ on the bar, and there is no strain upon the rod $a$, which is introduced more as a convenience, by which to operate the worm-piece with the thumb of the same hand which grasps the handle; and it is evident that the rod may be prismatic or of any form other than cylindrical, so that the rod, passing through a correspondingly-shaped hole, may operate to rotate either the collar or worm-piece provided with such hole.

Having thus described my invention, what I claim as new, and desire to secure by Letters Patent, is—

1. In an improved screw-wrench, a threaded worm-piece, $d$, having the ends of its threads $i'$ made sharp and of full size to fill the recesses $i$ in the bar, as and for the purposes set forth.

2. The worm-piece $d$, operated by a flattened or equivalent-shaped rod, $a$, passing through a correspondingly-shaped hole, $a'$, in combination with a collar, $e$, substantially as described.

3. The combination of the movable jaw C, worm-piece $d$, collar $e$, guide-piece $n$, rod $a$, and bar A, substantially as described.

ANDREW PARTRIDGE.

Witnesses:
T. A. CURTIS,
C. EUGENE BUCKLAND.